United States Patent
Monogioudis et al.

(10) Patent No.: US 7,065,159 B2
(45) Date of Patent: Jun. 20, 2006

(54) COMPENSATION BASED BIT-ERROR-RATE ESTIMATION FOR CONVOLUTIONALLY ENCODED TRANSMISSIONS IN WIRELESS SYSTEMS

(75) Inventors: Pantelis Monogioudis, Randolph, NJ (US); Kiran M Rege, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1027 days.

(21) Appl. No.: 09/808,376

(22) Filed: Mar. 14, 2001

(65) Prior Publication Data

US 2002/0172302 A1 Nov. 21, 2002

(51) Int. Cl.
*H03D 1/00* (2006.01)
*H04L 27/06* (2006.01)

(52) U.S. Cl. .................. 375/340; 375/324; 375/346; 370/332; 370/334; 714/704; 714/746; 714/754

(58) Field of Classification Search ................ 375/262, 375/225, 341, 232, 346, 340, 229, 324; 714/708, 714/758, 795, 704, 746, 754; 370/342, 332, 370/334

See application file for complete search history.

(56) References Cited

U.S. PATENT DOCUMENTS

| | | | | | |
|---|---|---|---|---|---|
| 5,710,784 | A | * | 1/1998 | Kindred et al. | 375/262 |
| 5,751,725 | A | * | 5/1998 | Chen | 714/708 |
| 5,917,837 | A | * | 6/1999 | Stein | 714/758 |
| 6,175,590 | B1 | * | 1/2001 | Stein | 375/225 |
| 6,222,830 | B1 | * | 4/2001 | Padovani et al. | 370/332 |

OTHER PUBLICATIONS

Yamamoto, H., and Itoh, K., "Viterbi Decoding Algorithm for Convolutional Codes with Repeat Requests", *IEEE Transactions on Information Theory*, vol. IT-26, No. 5, Sep. 1980.

* cited by examiner

*Primary Examiner*—Stephen Chin
*Assistant Examiner*—Ted M. Wang

(57) ABSTRACT

In a UMTS (universal mobile telecommunications system) based system, a wireless receiver comprises a convolutional decoder, a processor and memory. The convolutional decoder processes a received signal and provides a Yamamoto-Itoh (YI) metric to the processor. The processor (a) retrieves, from a look-up table stored in the memory, a compensation factor as a function of the YI metric value provided by the Viterbi decoder; (b) retrieves, from another look-up table stored in the memory, an initial BER estimate as a function of the YI metric; and (c) modifies the initial BER estimate with the retrieved compensation value to provide a BER estimate.

9 Claims, 9 Drawing Sheets

FIG. 3

| YI metric | Compensation Factor |
|---|---|
| 0.05 | 0.5 |
| 0.075 | 0.44 |
| 0.1 | 0.38 |
| ••• | ••• |
| 0.2 | 0.31 |

Look-up Table 220

| YI metric | Initial BER |
|---|---|
| 0.05 | 0.25 |
| 0.075 | 0.008 |
| 0.1 | 0.0025 |
| ••• | ••• |
| 0.15 | 0.00028 |

Look-up Table 225

COMPENSATION BASED BIT-ERROR-RATE ESTIMATION FOR CONVOLUTIONALLY ENCODED TRANSMISSIONS IN WIRELESS SYSTEMS

CROSS-REFERENCE TO RELATED APPLICATIONS

Related subject matter is disclosed in the co-pending, commonly assigned, U.S. Patent applications of Rege, entitled "A Non-Adaptive Symbol Error Count Based Technique for CDMA Reverse Link Outer Loop Power Control," application Ser. No. 09/052,581, filed on Mar. 31, 1998; and "An Adaptive Symbol Error Count Based Technique for CDMA Reverse Link Outer Loop Power Control," application Ser. No. 09/052,696, filed on Mar. 31, 1998; and the co-pending, commonly assigned, U.S. Patent application of Monogioudis et al., entitled "Bit Error Rate Based Reverse Link Outer Loop Power Control with Adaptive Compensation," application Ser. No. 09/514,608, filed Feb. 28, 2000.

FIELD OF THE INVENTION

This invention relates generally to communications and, more particularly, to wireless systems.

BACKGROUND OF THE INVENTION

Many of the bearer services that will be available over 3G (Third Generation) Wireless Systems such as UMTS (universal mobile telecommunications system) use block-based transmissions that, although protected by a Cyclic Redundancy Check (CRC), possess long transmission time intervals (TTI) that make necessary the estimation of bit error probability within the block and before the CRC is checked. As such, to provide some limited error protection these bearer services can employ convolutional or turbo encoding. In addition, these services typically require provisioning a certain Quality of Service (QoS) that is specified in terms of the average Bit-Error-Rate (BER) as seen by the end user. To that end, a wireless receiver needs to provide a BER estimate from the convolutional or turbo encoded received signal to support these services and their ability to deliver the desired QoS to the end user.

For bearer services employing turbo encoding, it is known in the art that a receiver can provide BER estimates for a received signal by using iterative decoding methods based on Maximum Aposteriori Probability (MAP) decoders or variants thereof (such as log-MAP, or Soft Output Viterbi Algorithm (SOVA)). These methods produce soft outputs representing the aposteriori log likelihood ratios for the received bits. From these soft outputs, BER estimates are computed in a straightforward manner.

In contrast, for those bearer services employing a convolutional coding scheme, there is a need to provide a method and apparatus to estimate the bit error rate—and, therefore, provide the ability to estimate the QoS as seen by the end user.

SUMMARY OF THE INVENTION

In accordance with the invention, a receiver processes a received signal to generate a Yamamoto-Itoh (YI) metric. The receiver provides a Bit-Error-Rate (BER) estimate for the received signal as a function of the YI metric.

In an embodiment of the invention, a wireless receiver, of a UMTS (universal mobile telecommunications system) based system, comprises a convolutional decoder, a processor and memory. The convolutional decoder processes a received signal and provides a YI metric to the processor. The processor (a) retrieves, from a look-up table stored in the memory, a compensation factor as a function of the YI metric value provided by the Viterbi decoder; (b) retrieves, from another look-up table stored in the memory, an initial BER estimate as a function of the YI metric; and (c) modifies the initial BER estimate with the retrieved compensation value to provide a BER estimate.

BRIEF DESCRIPTION OF THE DRAWING

FIG. 3 shows an illustrative look-up table for use in the portion of the wireless endpoint of FIG. 1.

DETAILED DESCRIPTION

This description is broken into two parts. The first part describes an illustrative embodiment of the inventive concept. The second part provides material on the analytical basis for the invention for those readers so interested.

1. Yamamoto-Itoh (YI) Metric Based Bit-Error-Rate (BER) Estimate

Figure 1:
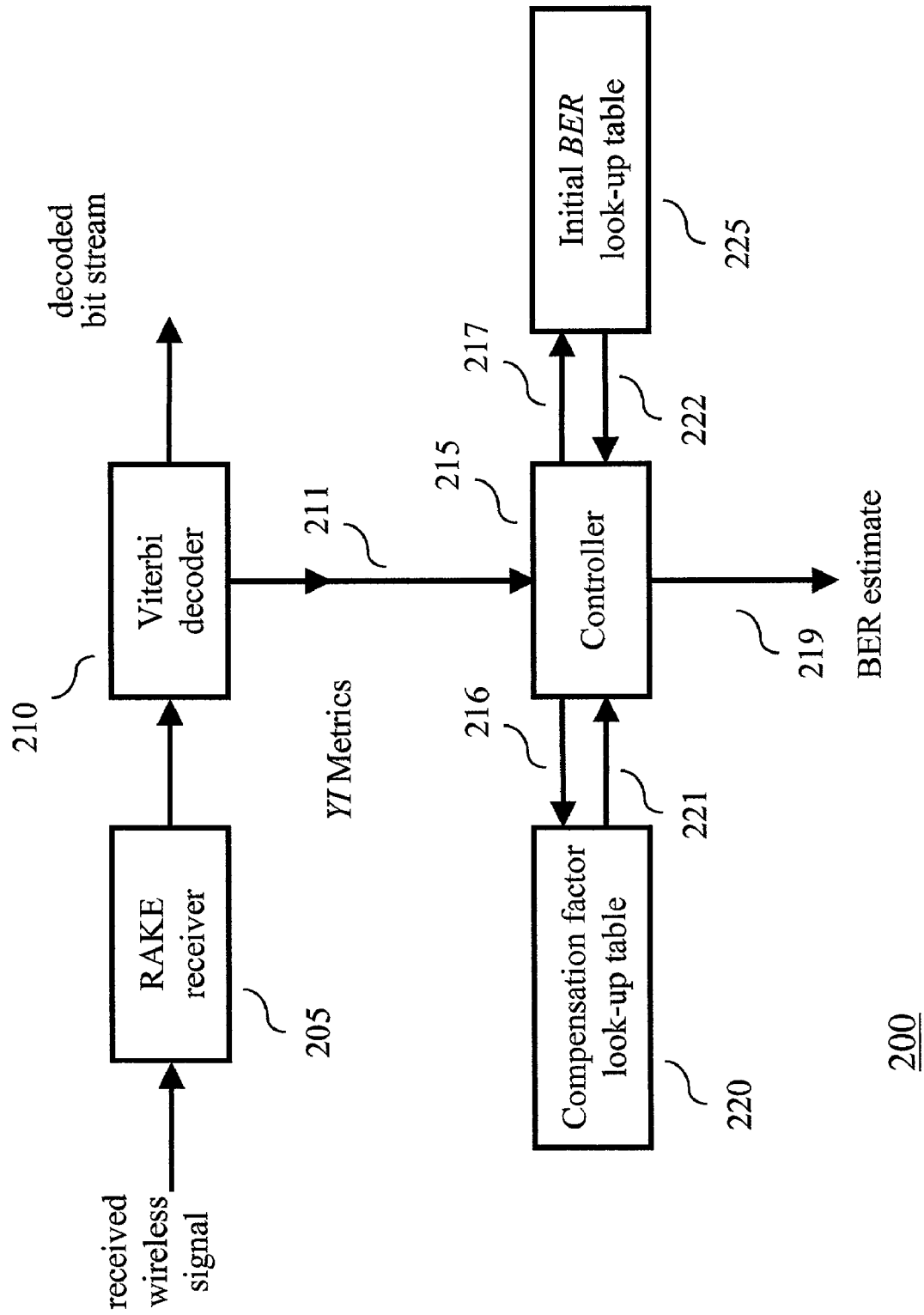
FIG. 1 shows a portion of a wireless endpoint embodying the principles of the invention.

FIG. 1 shows a portion of a wireless endpoint 200 embodying the principles of the invention. Other than the inventive concept, the elements shown in FIG. 1 are well-known and will not be described in detail. For example, controller 215 is representative of a stored-program-controlled processor with associated memory (not shown, except for look-up table 220) as known in the art. Also, only that portion of wireless endpoint 200 related to the inventive concept is shown, e.g., other processing by wireless endpoint 200 of a received signal is not described. Further, a detailed description of the receiving and demodulation of a wireless signal is not necessary for the inventive concept and, as such, has been simplified. Except as noted below, it is assumed that the wireless endpoint 200 is a part of a Code Division Multiple Access (CDMA) based (e.g., IS-95, CDMA2000, UMTS) mobile communications system and is in communication with another wireless endpoint (not shown). Wireless endpoint 200 is representative of any wireless device, e.g., a base station, mobile station, etc.).

Wireless endpoint 200 comprises RAKE receiver 205, Viterbi decoder 210, controller 215 and look-up tables 220 and 225. RAKE receiver 205 demodulates a received wireless signal and provides a symbol stream to Viterbi decoder 210. The latter provides a decoded bit stream and Yamamoto-Itoh (YI) metrics 211 associated with the corresponding received frame. (It should be noted that some existing chip sets designed for IS-95 base station receivers include YI metric computations as part of the Viterbi decoder. In fact, in some wireless receivers of the prior art, the YI metric is used to assist in frame selection, i.e., whether the frame is "good" or "bad.") The YI metric associated with the received frame is the minimum difference between the path metric associated with the path that is ultimately selected (the ultimate survivor!) and the path metric associated with any path that is discarded in comparison to the ultimate survivor at any stage of decoding. Further information on the YI metric can be found in Yamamoto, H., and Itoh, K., "Viterbi Decoding Algorithm for Convolutional Codes with Repeat Requests," *IEEE Transactions on Information Theory*, vol. IT-26, no. 5, September 1980. (It should be noted that although shown as part of the Viterbi decoder, the YI metric calculation can also be performed external to the Viterbi decoder assuming access to the Viterbi decoder path metrics.)

Figure 2:
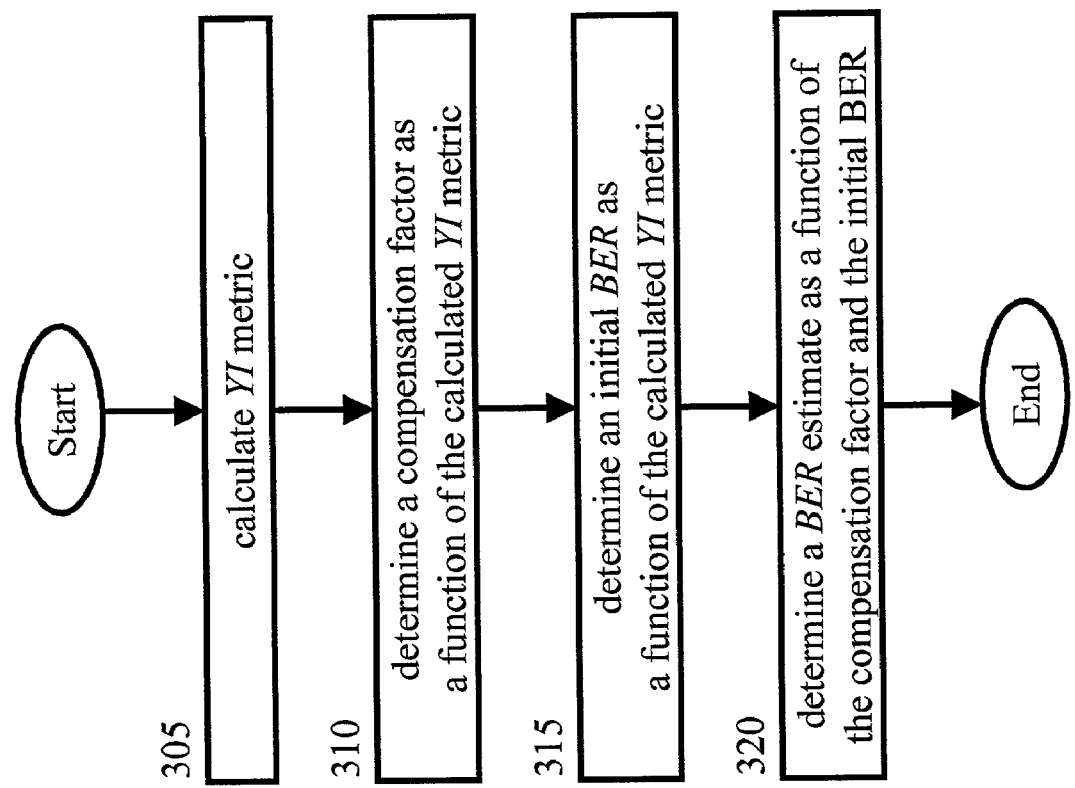
FIG. 2 shows an illustrative flow chart embodying the principles of the invention.
Figure 6:
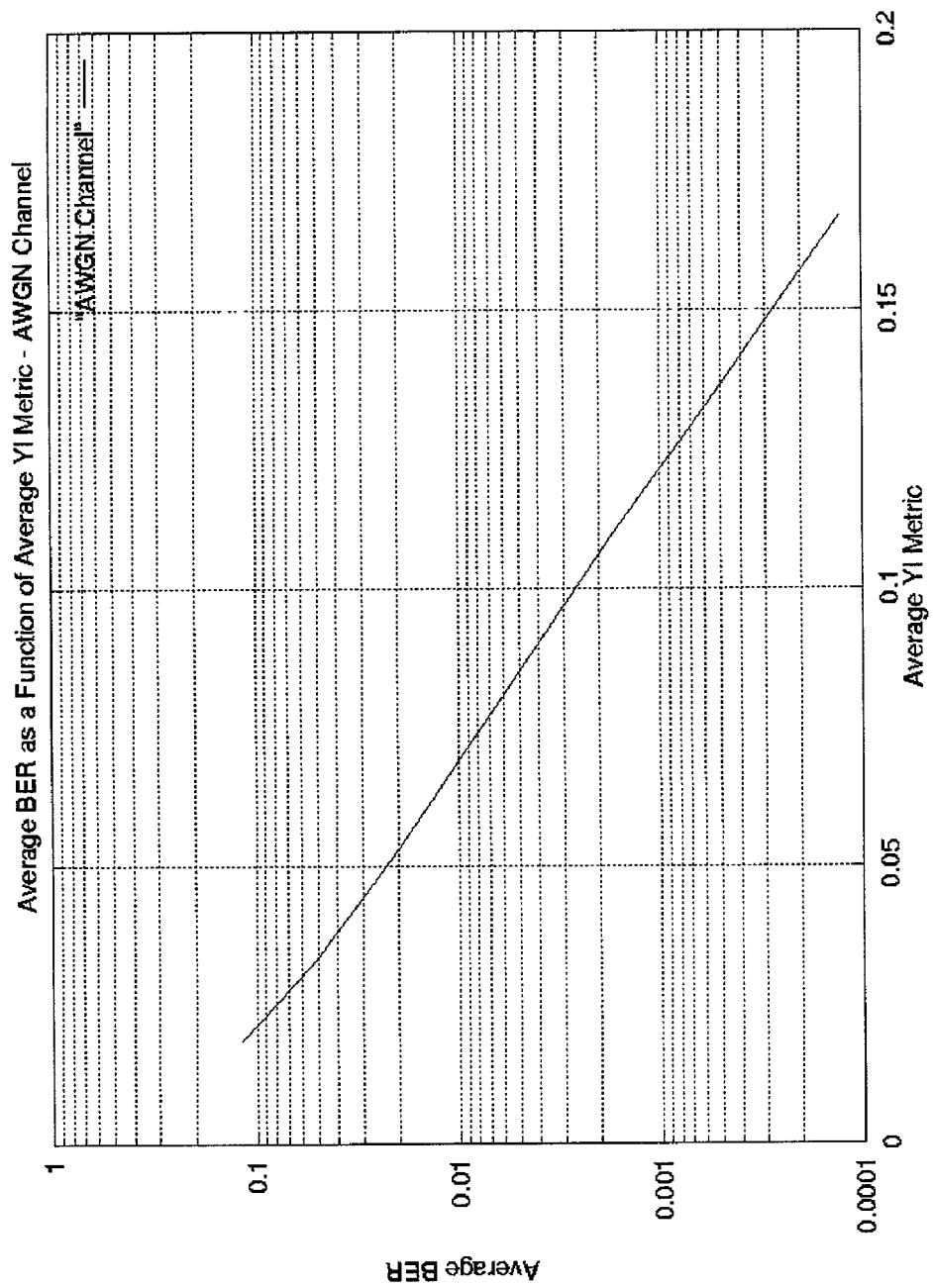
Figure 9:
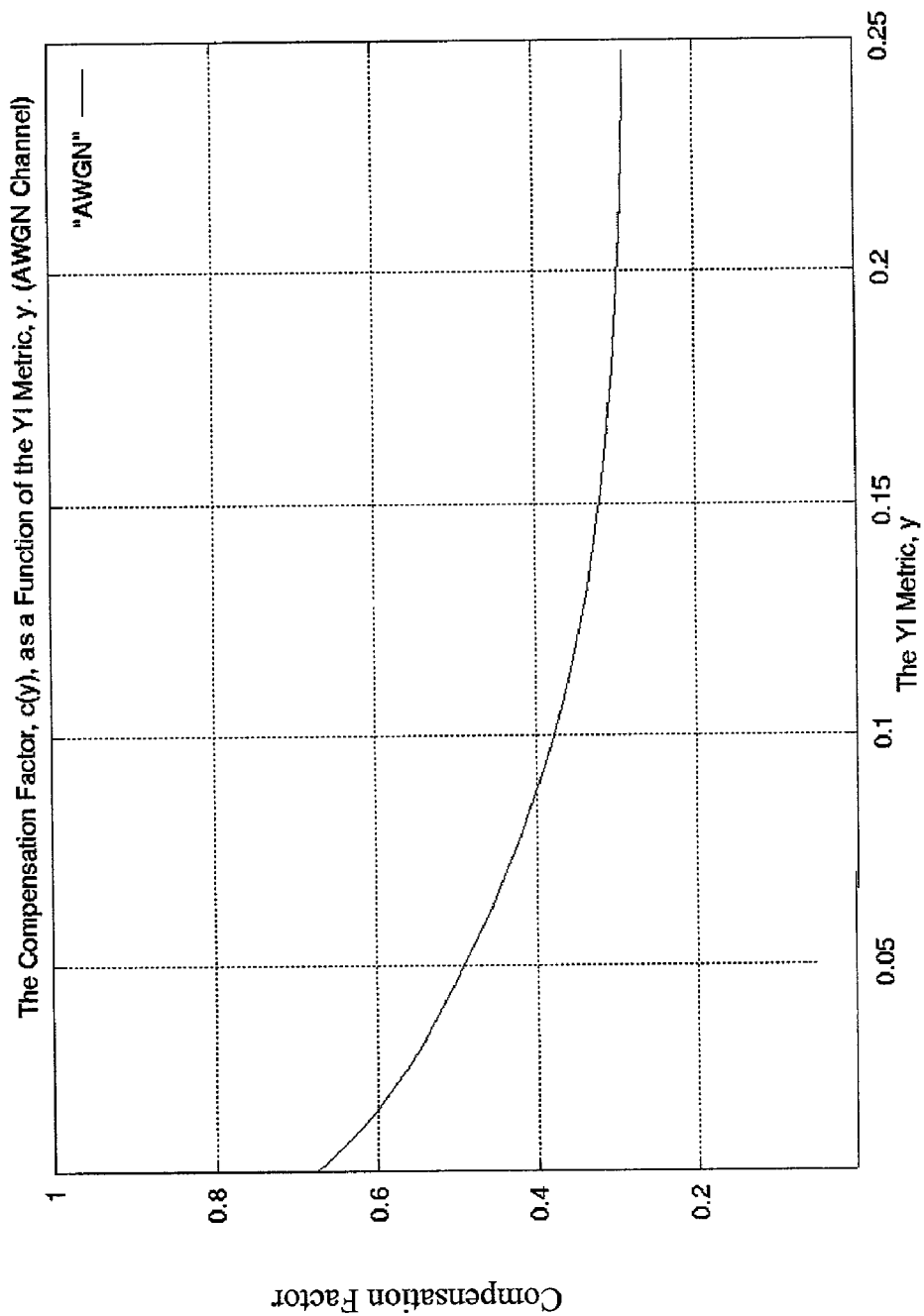

In accordance with the invention, controller 215 uses the YI metric to perform BER estimation. At this point, reference should also be made to FIG. 2, which shows an illustrative flow chart embodying the principles of the invention. (The inventive concept is implemented using conventional programming techniques, which as such, will not be described herein.) As noted above, it is assumed that Viterbi decoder 210 calculates the YI metrics in step 305. The calculated YI metric for a received frame is provided to controller 215, via signal 211. In step 310, controller 215 determines a compensation factor as a function of the calculated YI metric. Illustratively, in step 310, controller 215 retrieves an appropriate value for the compensation factor from look-up table 220 via signals 216 (YI metric value) and 221 (the retrieved compensation factor value) shown in FIG. 1. In particular, controller 215 uses the YI metric value as an index into look-up table 220 for retrieving an associated compensation factor. An illustrative look-up table is shown in FIG. 3. It is assumed that controller 215 suitably rounds the received YI metric value from Viterbi decoder 210 to the closest value used in look-up table 220. (Also, illustrative values for compensation factors versus YI values are shown in FIG. 9 (described below)). In a similar fashion, controller 215 determines an initial BER as a function of the calculated YI metric via look-up table 225, in step 315. An illustrative look-up table is shown in FIG. 3. (Also, illustrative values for BER versus YI values are shown in FIG. 6 (described below)). Finally, in step 320, controller 215 provides the BER estimate via signal 219. In particular, controller 215 determines the BER estimate in accordance with the following formula:

$$BER \text{ estimate} = (\text{compensation factor } (YI))(g'(YI)),$$

where $g'(YI)$ represents the initial BER estimate derived as a function of the YI metric for a frame. It should be noted that although not shown as a separate step, it is assumed that controller 215 computes a (time) average of the compensated BER estimate over, e.g., several frames. (It should be noted that further modifications could also be made to the above-described method. For example, the two look-up tables shown in FIG. 1 can be combined into one look-up table with multiple entries such that controller 215 simply uses a YI metric value to index into the look-up table for retrieving associated compensation values and initial BER estimates. Also, as noted below, the YI metric value could be used to directly determine the BER estimate (sans compensation value). In this situation, e.g., the look-up table associates a YI metric value directly with a BER estimate (e.g., illustrative values are shown in the graph of FIG. 6, described below).)

Values for the above-mentioned look-up tables (e.g., the mapping of the relationship between compensation factor and YI metric) can be determined a priori either analytically or via simulations (described below).

2. Analysis

As is well known, frame based convolutionally encoded transmission are decoded at the receiver using a Viterbi decoder. (For general information on a Viterbi decoder see, e.g., Viterbi, A. J., and Omura, J. K., Principles of Digital Communication and Coding, McGraw-Hill, New York, 1979.) The Viterbi decoder produces as its output the maximum likelihood transmitted sequence. That is, if R is the received frame, then the Viterbi decoder produces the sequence X at its output if the probability that X was the originally transmitted sequence given the received frame R (Pr[R|X]) is greater than or equal to (Pr[R|Y]) for all Y in the set of possible transmitted (or input) sequences. In order to simplify receiver implementation, logarithms of probabilities, rather than probabilities themselves, are used as "path metrics" and "branch metrics." The Viterbi algorithm operates in stages. At every stage, the Viterbi algorithm computes (and stores) the best path (i.e., one with the lowest path metric) leading to every possible state of the encoder. In systems using binary input sequences, the best path ending on a particular state at a given stage is computed by comparing the path metrics of the two possible paths (each of which is the best path up to the previous stage) ending on that state and choosing the one with the better path metric as the survivor at that stage. Let s and r respectively denote the path that is selected and the one that is rejected at state k during decoding stage i. Let p(s) and p(r) respectively denote their path metrics up to that stage. Clearly, the difference between these path metrics at that stage is |p(s)−p(r)|. Let S denote the path that ultimately survives when the decoding process is over so that it is looked upon as the best estimate (in a maximum likelihood sense) of the input sequence from the viewpoint of the receiver. Then, the Yamamoto-Itoh metric associated with the received frame is the minimum difference between the path metric associated with s at any stage of decoding and the path metric associated with the path that was rejected at that stage. This metric is referred to as the "minimum Yamamoto-Itoh metric" or the YI metric. Further information on the YI metric can be found in Yamamoto, H., and Itoh, K., "Viterbi Decoding Algorithm for Convolutional Codes with Repeat Requests," *IEEE Transactions on Information Theory*, vol. IT-26, no. 5, September 1980. The YI metric for a received frame can be calculated with relatively little addition to the complexity of the Viterbi decoder. In fact, many of the chip sets designed for IS-95 base station receivers include YI metric computations as part of the Viterbi decoder (e.g., see TIA/EIA/IS-95 Interim Standard, *Mobile Station—Base Station Compatibility Standard for Dual-Mode Wide Band Cellular Systems*, Telecommunication Industries Association, July 1993).

As such, the YI metric can be looked upon as a measure of the reliability of the decoding decision since a small value of the YI metric indicates a greater likelihood of making a decoding error. Conversely, a large value of the YI metric would indicate certain robustness in the corresponding decoding decision. In fact, in some wireless receivers of the prior art, the YI metric is used to assist in frame selection, i.e., the "correctness of a decoding decision—whether a received frame is "good" or "bad." However, we have observed that bit errors are also associated with the correctness of a decoding decision—and, therefore, it is possible to use the YI metric as a predictor of the possibility of bit errors in the decoded frame. To accomplish this, it is desired, ideally, to establish the following functional relationship:

$$BER = f(YI), \quad (1)$$

where YI is the Yamamoto-Itoh metric associated with a received frame and BER is the estimate of the "instantaneous bit error rate" associated with that frame. Unfortunately, the relationship between the YI metric and the BER does not hold in a deterministic manner, on a frame-byframe basis. This is because even in a fixed environment, such as an Additive White Gaussian Noise (AWGN) channel with a given signal-to-noise ratio ($E_b/N_o$), the number of bit errors in a frame and the YI metric for that frame are both random variables with less than perfect correlation. Consequently, equation (2), below, shows a different form of equation (1)—where the deterministic relationship is between the average BER (i.e., E[BER]) and the average YI metric (i.e., E[YI]):

$$E[BER]=g\ (E[YI]), \quad (2)$$

where both ensemble averages may be replaced by time averages in a practical implementation. It is hoped that the relationship represented by equation (2) holds in all operating environments characterized by different Doppler speeds and multipath profiles. It may be too much to expect that the relationship represented by equation (2) holds in all operating environments. However, to the extent that the variations that occur in different environments are small, one can use equation (2) with a fair degree of confidence in BER estimation and control schemes.

One application of equation (2) is in a power control scheme designed to hold the average BER around a specified target. If $T_{BER}$ is the desired average BER, the corresponding average value of the YI metric (denoted as $T_{YI}$) is:

$$T_{YI}=g^{-1}(T_{BER}). \quad (3)$$

Once the target for the average value of the YI metric is determined, it can be used in a power control scheme that that monitors the local average of the YI metric (through filtering) and then adjusts the power upward or downward depending on whether the local average is less than or greater than $T_{YI}$.

The relationship represented by equation (2) can be determined for use in providing BER estimation. For the purposes of analysis, it is assumed that the communication system of interest is similar to the downlink of in an IS-95 based wireless system operating at Rate Set 1 which uses a ½ rate convolutional code with interleaving as specified in TIA/EIA/IS-95 Interim Standard, *Mobile Station—Base Station Compatibility Standard for Dual-Mode Wide Band Cellular Systems*, Telecommunication Industries Association, July 1993.

Figure 4:
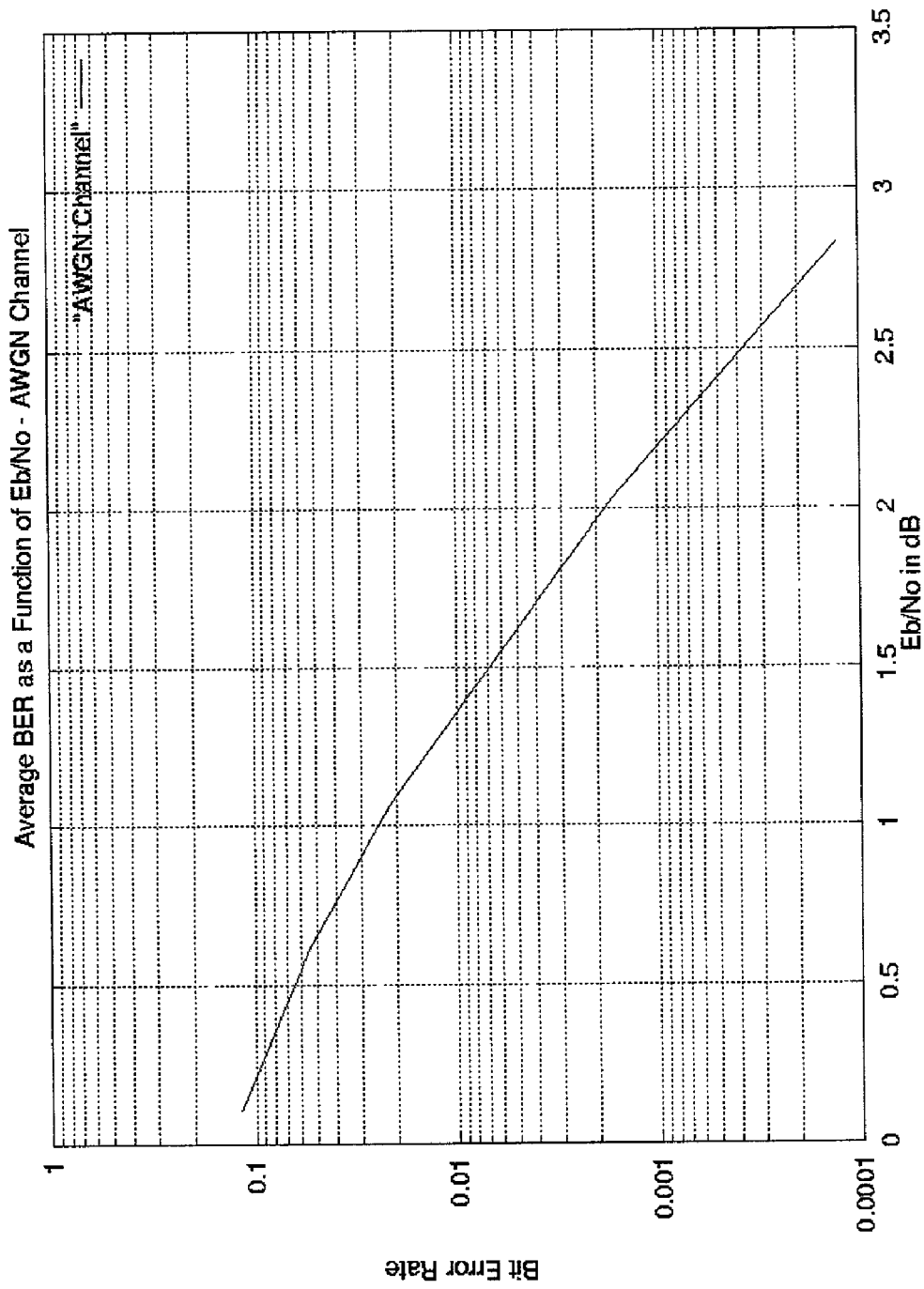
FIGS. 4–9 show various graphs.
Figure 5:
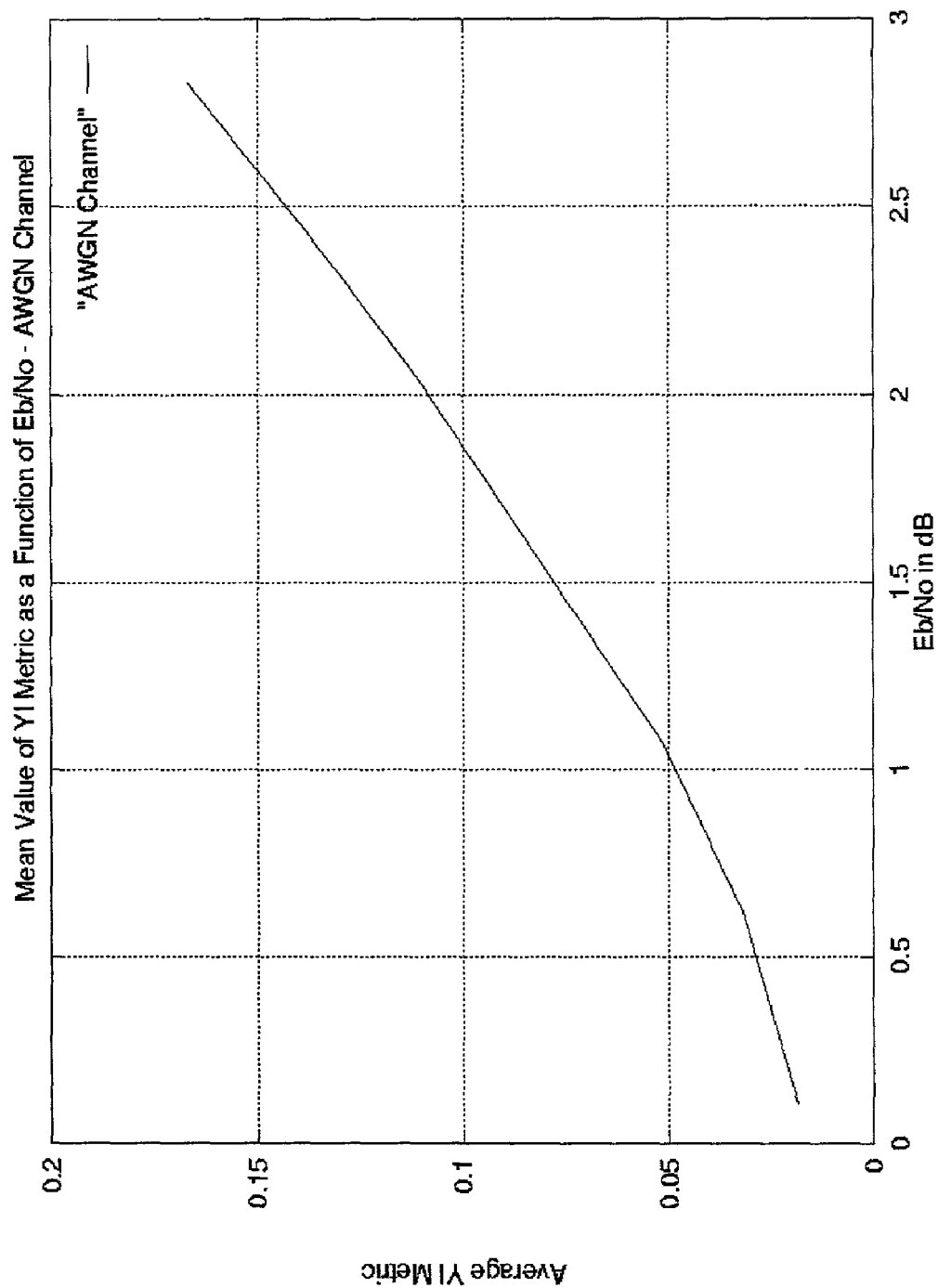

A symbol level simulation of this system operating in an AWGN channel was run at different values of the receiver signal-to-noise ratio. The symbol level simulation assumes ideal channel estimation at the receiver. FIGS. 4 and 5 respectively show simulation results for the average (post-decoding) BER and the average value of the YI metric as a function of the $E_b/N_o$ measured at the receiver. From these graphs, a plot can be made of E[BER] as a function of E[YI] for the AWGN channel. This plot is shown in FIG. 6. It is straightforward to fit a curve capturing the relationship between E[YI] and E[BER] as given in FIG. 6. For convenience, this relationship can be approximated with a simple analytic relationship, namely, E[BER]=g'(E[YI]), where the function g'(x) is given by:

$$g'(x) = \begin{cases} \exp[\ln 0.5 - x[(\ln 0.5 - \ln 0.118)/0.0185]], & \text{if } x < 0.0185, \\ \exp[\ln 0.118 - (x - 0.0185) \\ [(\ln 0.118 - \ln 0.00026)/0.1315]], & \text{otherwise.} \end{cases} \quad (4)$$

The function g'(x) embodies a simple piecewise linear relationship between the logarithm of the expected value of BER and the expected value of the YI metric.

Strictly speaking, the functional relationship represented by equation (4) between E(BER) and E(YI) has been established by considering the AWGN channel alone. However, it is assumed that this relationship holds good for other channels as well. This assumption is central to using a YI metric as a basis for BER estimation. In addition, it is assumed that when the Viterbi decoder, after processing a received frame, generates the YI metric for that frame, that g'(YI) is an estimate of the bit error rate for that frame. Thus, the BER estimation method using a YI metric can be succinctly described as follows.

Whenever the Viterbi decoder at the receiver processes a received frame and produces the YI metric for that frame, treat g'(YI) as an estimate of the BER for that frame. Now compute the (time) average of this estimate through a suitable filtering (e.g. a single pole infinite impulse response filtering), or averaging, technique to produce a more robust estimate of the average bit error rate for the desired time-frame. The following mathematical relationship represents the essence of this method:

$$B\hat{E}R=<g'(YI)>, \quad (5)$$

where $B\hat{E}R$ represents the estimate of the average bit error rate for the desired time frame and <X> represents a time average of the stochastic process X, computed via suitable filtering or averaging techniques. This method is referred to herein as the "simple BER Estimation Based on the Yamamoto-Itoh Metric."

Unfortunately, we have determined that the use of the simple BER estimation technique based on the YI metric overestimates the bit error rate in all environments. One reason for this overestimation is because the simplifications on which the first BER estimation is based assumes that the functional relationship embodied in "g'." (which characterizes the relationship between the average value of the YI metric and the average value of the BER) can be substituted for the relationship that exists between the YI metric for a frame and the corresponding BER estimate on a frame by frame basis. However, even in an AWGN environment with a fixed signal to noise ratio ($E_b/N_o$), the YI metric behaves like a random variable with considerable variation from frame to frame. Also, the relationship between the average value of the YI metric and the average BER is highly non-linear. Consequently, it can be observed that even in the AWGN environment the average value of the BER estimate, E[$B\hat{E}R$], calculated using the relationship E[$B\hat{E}R$]=E(g'[YI]), will be significantly different from the true average E(BER), which bears the relationship E[BER]=g'(E[YI]) with the average value of the YI metric. Therefore, and in accordance with the invention, a compensated YI metric based BER estimation is used to account for the effect of the variation of the YI metric and the non-linear relationship between E(BER) and E[YI].

This is done as follows. Once again, it is assumed that the communication system is operating in an AWGN environment with the $E_b/N_o$ held constant at, say, w dB. For a given value of w, the average values of the BER and the YI metric can be determined from FIGS. 4 and 5, respectively.

The relationship (seen in FIG. 5) between the $E_b/N_o$ represented by the variable w and the mean value of the YI metric can be approximated by the piecewise linear function h'(w) given below:

$$h'(w) = \begin{cases} 0.0515 + (w - 1.072)/15.25, & \text{if } w > 1.072, \\ 0.0185 + (w - 0.103)/29.36, & \text{if } -0.293 < w \le 1.072, \\ 0.005, & \text{otherwise.} \end{cases} \quad (6)$$

Figure 7:
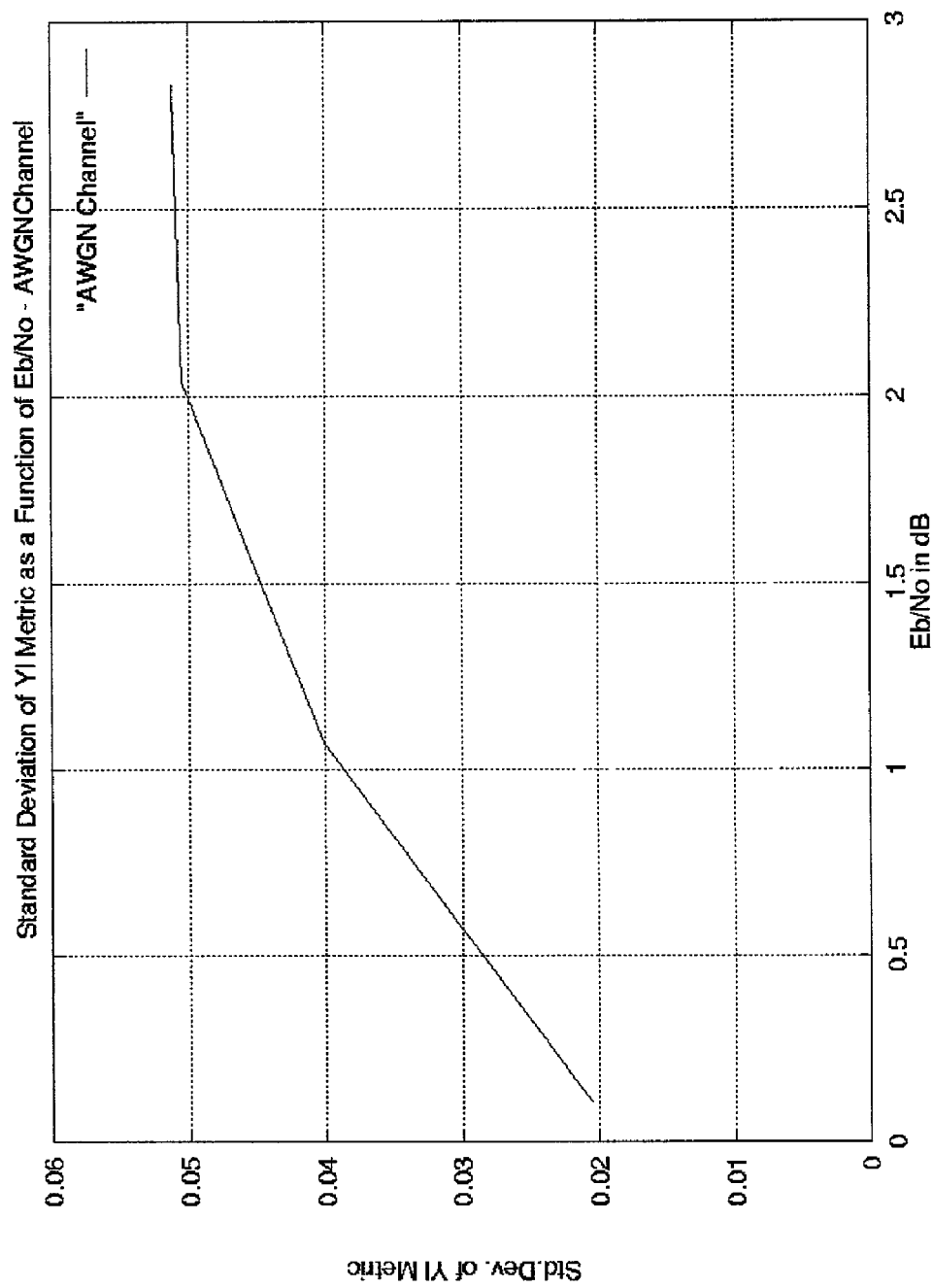

Turning now to FIG. 7, this shows the standard deviation of the YI metric as a function of the $E_b/N_o$ for AWGN channels. The relationship depicted in FIG. 7 is approximated by the piecewise linear function, k'(w), given by:

$$k'(w) = \quad (7)$$
$$\begin{cases} 0.0505 + [0.0007(w - 2.041)/0.792], & \text{if } w > 2.041, \\ 0.0401 + [0.0104(w - 1.072)/0.969], & \text{if } 1.072 < w \le 2.041, \\ 0.0205 + [0.0196(w - 0.103)/0.969], & \text{if } -0.169 < w \le 1.072, \\ 0.015, & \text{otherwise.} \end{cases}$$

The last conditions in equations (6) and (7) are equivalent to placing a floor on the lowest values that h'(w) and k'(w) can respectively take.

The functional relationships given in equations (6) and (7) are used to determine the mean and the standard deviation of the YI metric when the $E_b/N_o$ is held at w in an AWGN channel.

From equations (6) and (7), the mean value and the standard deviation of the YI metric can be determined for any given value of the $E_b/N_o$ for the AWGN channel, yielding a two parameter characterization of the stochastic nature of the YI metric. With this two-parameter characterization for any given value of the $E_b/N_o$, say w, any suitable family of probability distribution functions (PDFs) that are amenable to two-parameter characterization can be used to approximate the PDF of the YI metric. Since the Yamamoto metric can never be negative, one of the properties of any applicable family PDFs is that they should have no probability mass below zero.

Illustratively, the non-central Chi-square family of PDFs (with degrees of freedom equal to 2) is used to approximate the PDF of the YI metric. Consider a random variable, Z, whose PDF belongs to this family. Z can be written as:

$$Z = X^2 + Y^2, \quad (8)$$

where X and Y are independent and identically distributed Gaussian random variables with mean m and standard deviation s. It follows then that the mean, $m_z$, and variance, $v_z$, of the random variable Z are respectively given by:

$$m_z = 2m^2 + 2\sigma^2 \quad v_z = 8\sigma^2 m^2 + 4\sigma^4. \quad (9)$$

Returning briefly to the simple BER estimation procedure described in the earlier section, the error in BER estimation that is likely to occur can be determined as follows. Recall that this procedure assumes that if the YI metric computed by the Viterbi decoder after processing a frame is z, then the local BER estimate is g'(z) where g'(.) is as given in equation (4). The estimate of BER produced by this procedure is given by <g'(YI)>, which is a time average of the quantity g'(YI). Assuming certain ergodicity properties, the expected value of this time average is given by:

$$E[<g'(YI)>]_w = E[g'(YI)]_w. \quad (10)$$

In equation (10), the subscript w is used to indicate the fact that the expectations have been carried out assuming an AWGN environment with $E_b/N_o$ equal to w. Assuming that the YI metric has a Chi-square distribution with mean and standard deviation equal to h'(w) and k'(w) respectively, the expected value of the BER estimate computed by the simple BER estimation method can be determined in a straightforward manner:

$$E[\hat{BER}]_w = E[g'(YI)]_w = \int_0^\infty f_w(z)g'(z)dz, \quad (11)$$

where $f_w(z)$ denotes the non-central Chi-square probability density function with mean h'(w) and standard deviation k'(w). (It should be noted that the above integral can be evaluated numerically to any desired degree of accuracy. Chi-square distributions corresponding to different values of $m_z$ and $v_z$ can be generated through simulations (as is known in the art) for use in evaluating the above integral.)

The quantity, $E[g'(YI)]_w$, evaluated via the above integral, can be contrasted with the true average value of BER, $E[BER]=g'(E[YI])=g'(h'(w))$. The ratio of the true expected value of BER and the expected value of the BER estimate is denoted by r(w):

$$r(w) = \frac{g'(h'(w))}{E[g'(YI)]_w}. \quad (12)$$

Figure 8:
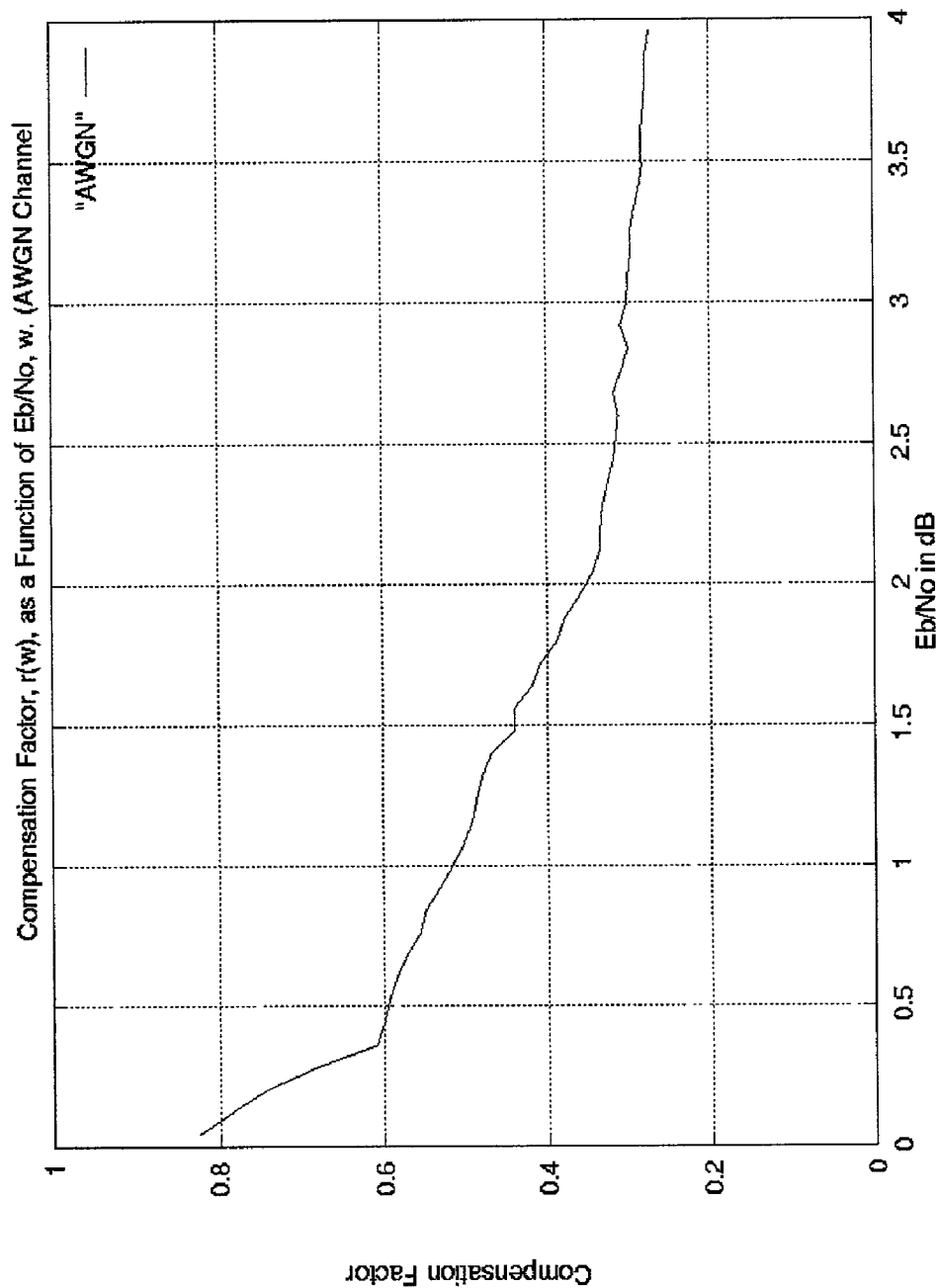

FIG. 8 shows the behavior of this ratio, when the $E_b/N_o$, w, is varied over the range 0 to 4 dB.

In accordance with the invention, if the system is known to operate in an environment where the $E_b/N_o$ is in the vicinity of some fixed value, say w, then the BER estimate produced by the simple BER estimation procedure (described above) is modified so that the expected value of the (modified) BER estimate would equal the true expected value of BER. This is done simply by multiplying the BER estimate g'(YI) by the compensation factor r(w). In other words, when the value of the YI metric produced by the Viterbi decoder is x, instead of treating g'(x) as the estimate of the local BER, the estimate of the local BER is given by $g_w''(x) = r(w)g'(x)$. It is easy to show that the expected value of this modified estimate equals the true expected value of the BER when the $E_b/N_o$ associated with the AWGN channel is held at w dB.

In general, the $E_b/N_o$ level at the receiver hardly stays close to a fixed value. One may, on the other hand, have some idea about the range over which it typically varies. It is assumed that the receiver $E_b/N_o$ is known to take values in the range $[W_L, W_H]$. In that case, the following approach can be taken to compute the compensation factor assuming that the $E_b/N_o$ is uniformly distributed over the range $[W_L, W_H]$.

It is assumed that the YI metric produced by the receiver for a given received frame is y. Now, for a given $E_b/N_o$ value, w, it has been assumed that the YI metric has a non-central Chi-square distribution with mean h'(w) and standard deviation k'(w). This distribution is represented by the probability density function $f_w(.)$ as described earlier. Therefore, if the $E_b/N_o$ level is w, the probability that the YI metric is within the range [y, y+dy] is $f_w(y)dy$. Therefore, since the $E_b/N_o$ is uniformly distributed over $[W_L, W_H]$, the probability that the underlying $E_b/N_o$ is in the range [w, w+dw] given that the YI metric is y equals:

$$Pr[w < E_b/N_o \leq w + dw] = \frac{f_w(y)dw}{\int_{W_L}^{W_H} f_z(y)dz}, \quad W_L \leq w \leq W_H. \quad (13)$$

In equation (13), the function $f_z(y)$ denotes the Chi-square conditional probability density function of the YI metric given that the underlying $E_b/N_o$ is z dB. As stated above, if the $E_b/N_o$ level is around w, the compensation factor should be r(w). Combining this fact with equation (12) yields:

$$C(y) = \frac{\int_{W_L}^{W_H} r(w)f_w(y)dw}{\int_{W_L}^{W_H} f_z(y)dz}, \quad (14)$$

where the symbol C(y) denotes the compensation factor to be used if the observed YI metric for a received frame is y. In other words, given that the YI metric for a received frame is y, the local BER estimate produced by this method is given by:

$$B\hat{E}R = C(y)g'(y). \quad (15)$$

FIG. 9 shows the compensation factor C(y) as a function of the value of the YI metric y.

This method is referred to as the Compensated Yamamoto-Itoh Metric Based BER Estimation method.

From the viewpoint of complexity, both of the YI metric based BER estimation techniques are simple to implement. For a given coding scheme and framing parameters, they would require the implementation of a YI metric—BER mapping which can be stored in the form of a look-up table or a procedure implementing a scalar functional relationship.

It should be noted that the BER estimation techniques presented here are meant for estimating the average bit error rate observed over a long period (e.g., at least 50 to 100 frames). This is not a limitation of the techniques themselves. Rather, this limitation is due to the fact that bit errors are a rather volatile phenomenon so that one needs a long observation period to obtain a relatively stable estimate. In a given operating environment, if one were to obtain a BER estimate for a relatively short observation period and compare it to the actual bit error rate for that period, one could easily find significant discrepancy between the two even when a sophisticated BER estimation technique is used. It is only after averaging the bit errors over a long period that one would be able to obtain a good match. This limitation has an important consequence as far as BER estimate based control schemes are concerned—they will have to be relatively slow-acting to avoid potential stability problems.

The foregoing merely illustrates the principles of the invention and it will thus be appreciated that those skilled in the art will be able to devise numerous alternative arrangements which, although not explicitly described herein, embody the principles of the invention and are within its spirit and scope. For example, if this scheme is used in a Bit-Error-Rate-based power control loop, it will cause the median of the BER estimates to equal the target BER. Also, although shown as separate elements, any or all of the elements of FIG. 1 (e.g., Viterbi decoder 210) may be implemented in a stored-program-controlled processor (such as controller 215).

What is claimed:

1. A method for use in wireless equipment, the method comprising the steps of:
   receiving a signal;
   processing the received signal to generate a Yamamoto-Itoh (YI) metric,
   determining a Bit-Error-Rate (BER) estimate for the received signal as a function of the YI metric,
   wherein the determining step further comprises the steps of:
   retrieving, from at least one look-up table stored in a memory, a value for a compensation factor as a function of a value of the generated YI metric and an inital BER estimate as a function of the generated YI metric; and
   modifying the initial BER estimate value with the retrieved compensation factor value to determine the BER estimate.

2. A method for use in wireless equipment, the method comprising the steps of:
   processing a received signal to generate at least one Yamamoto-Itoh (YI) metric value over a time period;
   selecting a compensation factor value as a function of the generated YI metric value;
   selecting an initial Bit-Error-Rate (BER) estimate value as a function of the generated YI metric value; and
   determining a Bit-Error-Rate (BER) estimate for the received signal as a function of the initial BER estimate value and the selected compensation factor value.

3. The method of claim 2 wherein the determining step further includes the step of multiplying the selected compensation factor value by the initial BER estimate value to determine the BER estimate.

4. A method for use in wireless equipment, the method comprising the steps of:
   processing a received signal to provide an initial Bit-Error-Rate (BER) estimate value for the received signal;
   modifying the initial BER estimate value for the received signal with a compensation factor value to provide a Bit-Error-Rate (BER) estimate for the received signal, wherein the compensation factor value is determined as a function of at least one Yamamoto Itoh (YI) metric value.

5. Apparatus for use in wireless equipment, the apparatus comprising:
   a convolutional decoder for processing a received signal for use in determining at least one Yamamoto-Itoh (YI) metric value,
   a processor for determining a Bit-Error-Rate (BER) estimate for the received signal as a function of the at least one YI metric value,
   wherein the processor (a) retrieves, from at least one look-up table stored in a memory, a compensation factor value as a function of the at least one YI metric value and an initial BER estimate value as a function of the least one YI metric value, and (b) modifies the initial BER estimate value with the retrieved compensation factor value to determine the BER estimate.

6. Apparatus for use in wireless equipment, the apparatus comprising:
   a convolutional decoder for processing a received signal for use in determining at least one Yamamoto-Itoh (YI) metric value,
   a processor for determining a Bit-Error-Rate (BER) estimate for the received signal as a function of the at least one YI metric value, wherein the processor (a) determines a compensation factor value as a function of the at least one YI metric value, (b) determines an initial BER estimate value as a function of the at least one YI metric value, and (c) determines the BER estimate for the received signal as a function of the initial BER estimate value and the selected compensation factor value.

7. The apparatus of claim 6 wherein the processor multiplies the selected compensation factor value by the initial BER estimate value to determine the BER estimate.

8. A wireless receiver comprising:
  a memory for storing a look-up table such that an index into the look-up table is a Yamamoto-Itoh (YI) metric value for retrieving an initial Bit-Error-Rate (BER) estimate stored therein; and
  a processor for modifying the initial BER value with a scale factor to determine a Bit-Error-Rate (BER) estimate for a received signal.

9. A method for use in wireless equipment, the method comprising the steps of:
  processing a received signal to generate a Yamamoto-Itoh (YI) metric,
  determining an initial Bit-Error-Rate (BER) estimate value for the received signal as a function of the YI metric,
  selecting, as a function of the generated YI metric, a value for a compensation factor; and
  modifying the initial BER estimate value with said compensation factor value to determine the BER estimate.

* * * * *